United States Patent
Czerski

(10) Patent No.: US 10,191,141 B2
(45) Date of Patent: Jan. 29, 2019

(54) LIGHT BEAM PAINTED FLUORESCENT RADAR IMAGE DISPLAY SCREEN

(71) Applicant: Norman Barrette Czerski, Eagle River, AK (US)

(72) Inventor: Norman Barrette Czerski, Eagle River, AK (US)

(*) Notice: Subject to any disclaimer, the term of this patent is extended or adjusted under 35 U.S.C. 154(b) by 0 days.

(21) Appl. No.: 15/731,807

(22) Filed: Aug. 2, 2017

(65) Prior Publication Data

US 2018/0329028 A1    Nov. 15, 2018

Related U.S. Application Data

(60) Provisional application No. 62/370,965, filed on Aug. 4, 2016.

(51) Int. Cl.
| | |
|---|---|
| *F21V 33/00* | (2006.01) |
| *G01S 7/06* | (2006.01) |
| *H04N 9/31* | (2006.01) |
| *F21V 9/32* | (2018.01) |
| *F21V 14/02* | (2006.01) |
| *G09G 3/02* | (2006.01) |
| *F21Y 115/10* | (2016.01) |

(52) U.S. Cl.
CPC ............ *G01S 7/06* (2013.01); *F21V 9/32* (2018.02); *F21V 14/02* (2013.01); *G09G 3/02* (2013.01); *H04N 9/3129* (2013.01); *F21Y 2115/10* (2016.08)

(58) Field of Classification Search
None
See application file for complete search history.

(56) References Cited

U.S. PATENT DOCUMENTS

| | | | | |
|---|---|---|---|---|
| 2,587,610 A | * | 3/1952 | Fox | ............................ G01S 7/06 |
| | | | | 342/144 |
| 2,809,324 A | * | 10/1957 | Shanafelt | .................. G01S 7/06 |
| | | | | 220/2.1 A |

* cited by examiner

*Primary Examiner* — Vip Patel
(74) *Attorney, Agent, or Firm* — Mohr Intellectual Property Law Solutions, PC

(57) ABSTRACT

The ultra-violet radar display screen is a low latency display screen that is adapted for use with radar systems. The ultra-violet radar display screen uses a radiation source that is used to fluorescence a fluorescent screen. The track of the generated radiation source is controlled using a plurality of rotating structures that send radiation to a target location on the fluorescent screen that is provided by the radar system the ultra-violet radar display screen is adapted to work with. The ultra-violet radar display screen improves on the existing response times of existing radar display screens because of the response time of the radiation source combined with the rotational speed and flexibility provided by each of the plurality of rotating structures. The ultra-violet radar display screen comprises a fluorescent screen, a plurality of rotating structures, a radiation source, and a synchronous resolution device.

20 Claims, 8 Drawing Sheets

LIGHT BEAM PAINTED FLUORESCENT RADAR IMAGE DISPLAY SCREEN

BACKGROUND

The present invention relates to the field of determination of direction and distance through the use of radio waves, more Specifically, a high latency fluorescent display screen for which a radar system may be adapted.

SUMMARY

The light beam radar display screen is a high latency Display screen for which a radar system may be adapted. The light beam radar display screen uses a radiation source to produce an illuminated image on a fluorescent screen. The track of the generated radiation source is controlled using a plurality of rotating structures that send radiation to a target location on the fluorescent screen for which the radar system has been adapted. The light beam radar display screen requires radar system adaptation.

Greater resolution over existing display screens is achieved because of the response time of the radiation source combined with the rotational speed and flexibility provided by each of the plurality of rotating structures. This allows for selection and expansion of selected portions of range segments. Thus any image portion can be viewed in great detail. Rotating structures eliminate the need for deflection circuits, high voltage cathode supply, filament voltage and an evacuated envelope which results in a saving of power, weight and cost. Additionally size is not limited by the requirement of an evacuated chamber.

These together with additional objects, features and advantages of the light beam radar display screen will be readily apparent to those skilled in the art upon reading the following detailed description of the presently preferred, but nonetheless illustrative embodiments when taken in conjunction with the accompanying drawings.

In this respect, before explaining the current embodiments of the light beam radar display screen in detail, it is to be understood that the light beam radar display screen is not limited in its application to the details of construction and arrangements of the components set forth in the following description or illustration. Those skilled in the art will appreciate that the concept of this disclosure may be readily utilized as a basis for the design of other structures, methods and systems for carrying out die several purposes of the light beam radar display screen. Claims include equivalent construction as they do not depart form the spirit and scope of the light beam radar display screen. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION

Figure 1:
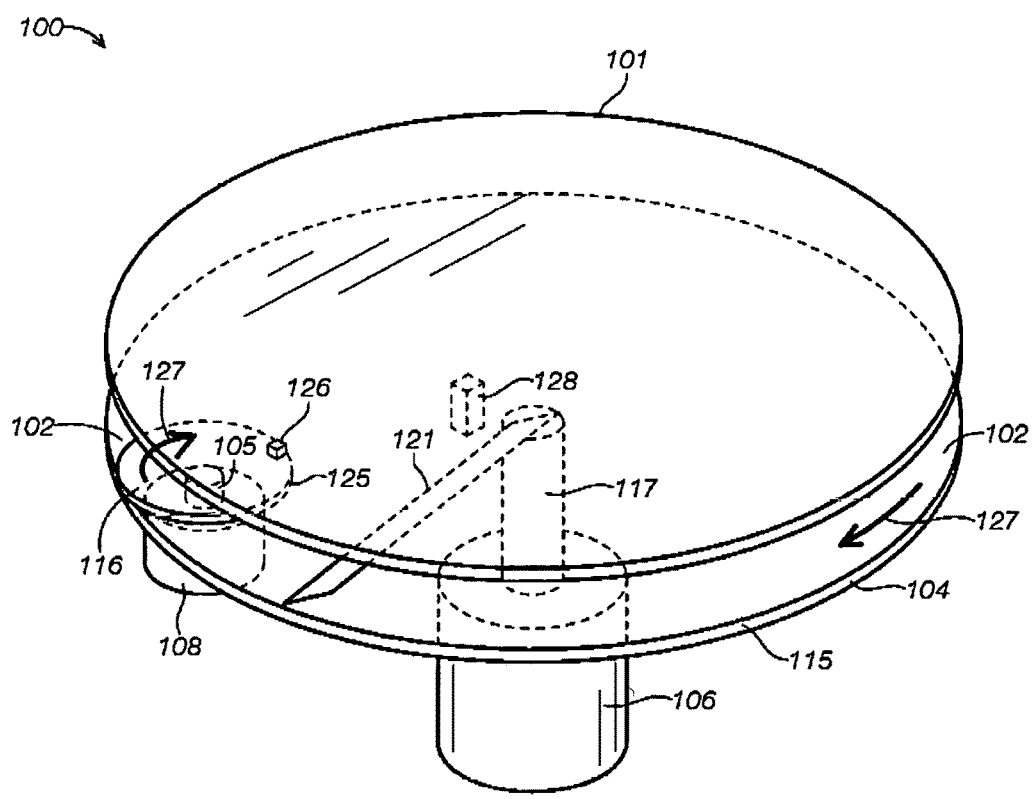
FIG. 1 is a perspective view of an embodiment of the disclosure.

The following detailed description is merely exemplary in nature and is not intended to limit die described embodiments of the application and uses of the described embodiments. As used herein, the word "exemplary" or "illustrative" means "serving as an example, instance, or illustration". Any implementation described herein as "exemplary" or "illustrative" is not necessarily to be construed as preferred of advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 8.

The light beam radar display screen 100 (hereinafter invention) comprises a fluorescent screen 101, rotating structures 102, radiation source 126 and a synchronous resolution device 106. The invention 100 is a high persistence display screen for which radar systems are adapted/manufactured for. The invention 100 uses a radiation source 126 that is used to fluoresce a fluorescent screen 101. The track of generated radiation source 126 is controlled using a plurality of rotating structures 102 that are used to send the output of the radiation source 126 to a target location on the fluorescent screen 101 that is part of the invention 100 for which radar systems are adapted for. The invention 100 improves on the existing response time of existing radar display screens because of the response time of the radiation source 126 combined with the rotational speed and flexibility provided by each of the plurality of rotating structures 102. The combination of the fluorescent screen 101 and the radiations source 126 also improves the resolution of the displayed image relative to the prior art.

The fluorescent screen 101 is a flat transparent material to which a fluorescent material is applied to the subsurface. When the fluorescent material is stimulated by radiation generated by the radiation source 126, the fluorescent material will fluoresce which will be visible through the transparent plate. The fluorescent screen 101 is the display upon which the information from die radar system will be displayed. The untreated surface of the fluorescent screen 101 can be marked or etched with information regarding the display without impacting the performance of the invention 100.

In the first potential embodiment of the disclosure, the radiation source 126 is an LED that is configured to generate near UV radiation. Specifically, a UV LED which responds to modulation at less than 5 nanoseconds is preferred. However, as a practical matter, commercially available UV LEOs which respond to video modulation faster response times, when viewing an expanded trace segment, will show target outline, shape, in much greater detail. Alternatively, lasers with electronic shutter/modulators at a suitable wavelength compatible with the fluorescent material could be used.

The plurality of rotating structures 102 further comprises a source structure 115 and a target structure 116. The source structure 115 houses the radiation source 126. The source structure 115 is a rotating structure that uses the radiation source 126 to generate the radiation that is reflected by the mirror structure 121 to fluoresce the fluorescent screen 101. The spin disk 116 is a rotating structure that directs the radiation emitted by the source structure 115 towards the mirror 121 which directs the radiation to the screen 101.

Figure 2:
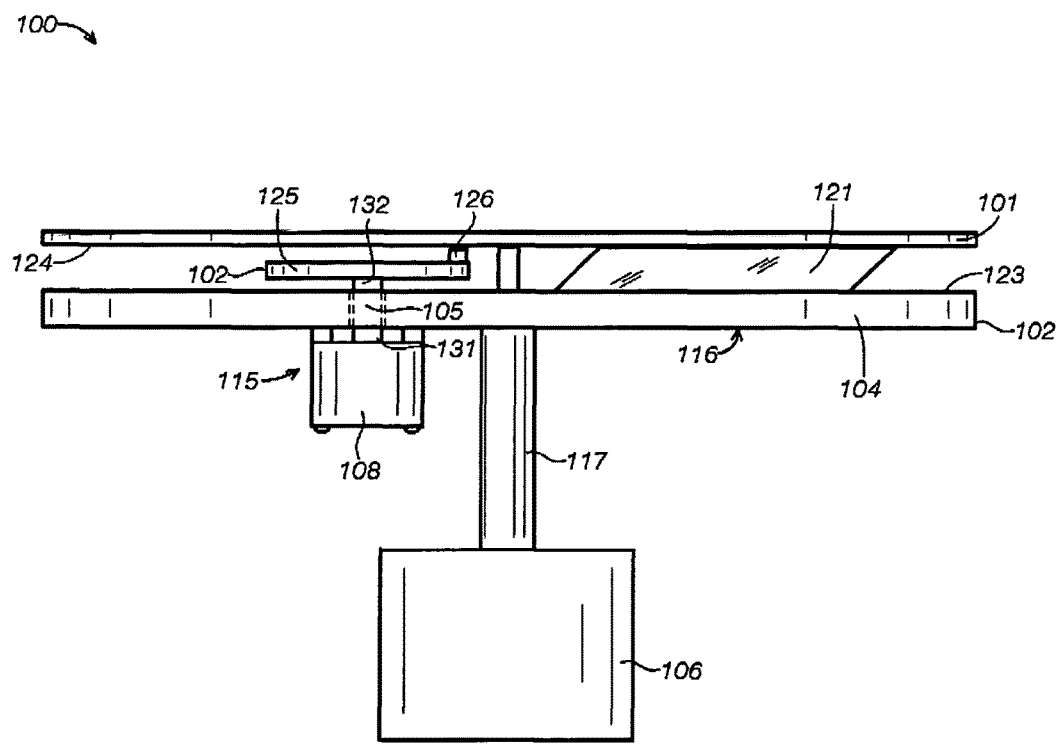
FIG. 2 is a side view of an embodiment of the disclosure.

As shown in FIGS. 1 and 2, the targeting structure is comprised of rotating disk 104, prism 121 and disk 126. Disk 104 is a disk shaped Structure that is mounted on a bearing structure that allows the first rotating disk 104 to rotate freely around the center of the first plane 123 of the first rotating disk 104. As shown in FIG. 2, the first plane 123 of the first rotating disk 104 is parallel to the second plane 124 of the surface of the fluorescent screen 101. As shown in FIG. 2, the triangular prism mirror 121 is positioned on the first rotating disk 104 such that when the first rotating disk 104 completes one revolution of rotation, the area traced by the triangular prism mirror 121 encompasses the surface area of the fluorescent screen 101.

In the first potential embodiment of the disclosure, as shown most clearly in FIG. 1, die sour c structure 115 comprises a rotating cylinder 105, the radiation source 126, and the prism mirror 121.

The rotating cylinder 105 is a hollow cylindrical structure that is further defined with a first end 131 and a second end 132. Both the first end 131 and the second end 132 are open. The rotating cylinder 105 is mounted on a bearing that allows the rotating cylinder 105 to freely rotate around the center axis of the rotating cylinder 105. The rotation of the first rotating disk 104 is controlled and operated independently of cylinder 105. The radiation source 103 may be positioned at the 131 of the rotating cylinder 105 and is aligned to send radiation generated by the radiation source 103 through the rotating cylinder 105 on a vector that is aligned with the center axis of the rotating cylinder 105. The cylinder mirror 122 is mounted on the second end 132 of the rotating cylinder 105 such that cylinder mirror 122 rotates with the rotating cylinder 105 in a fixed position relative to the rotating cylinder 105.

Figure 3:
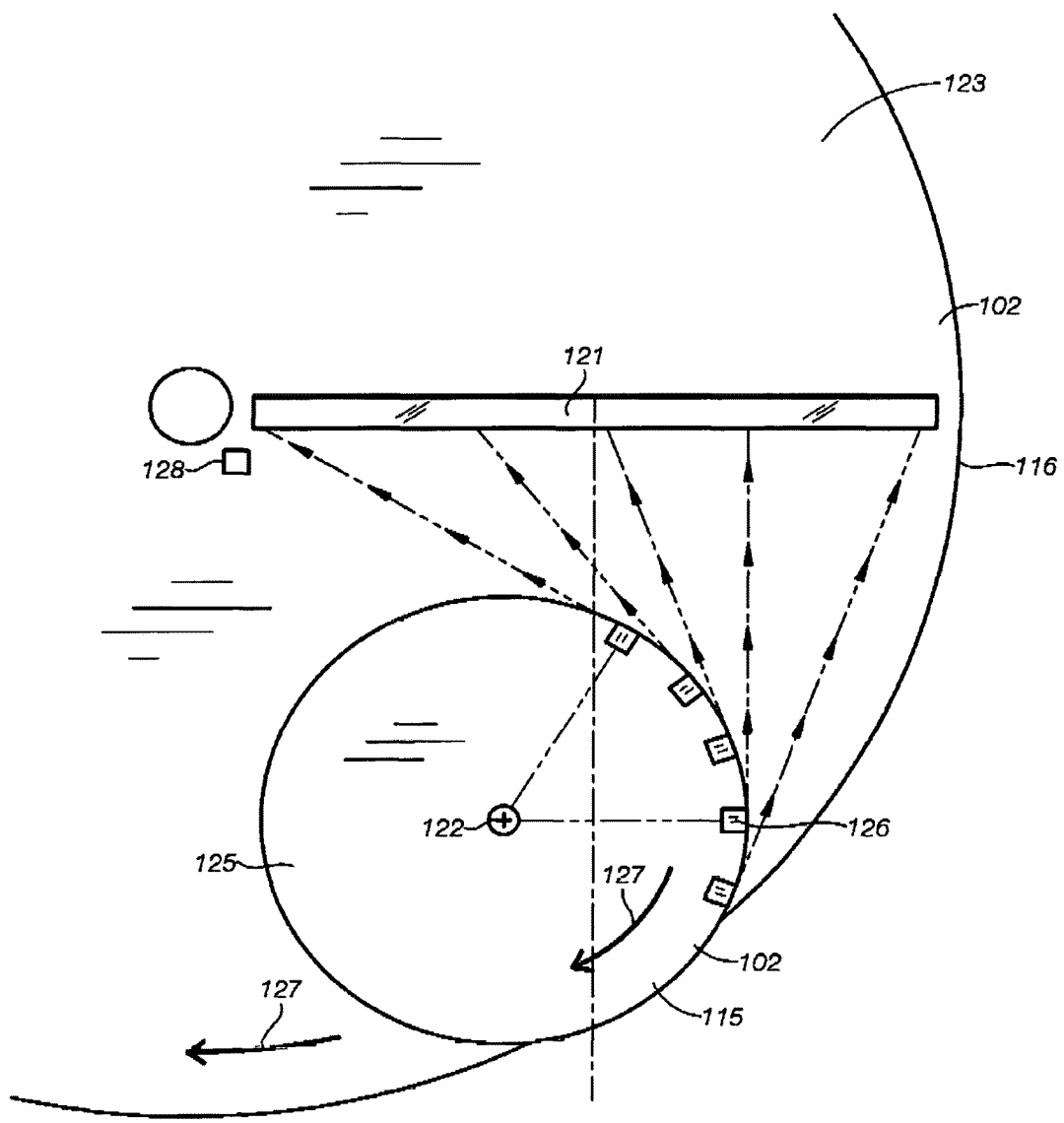
FIG. 3 illustrates a variation of the spin disk used to improve linearity of the range trace and keep focal distance constant.
Figure 4:
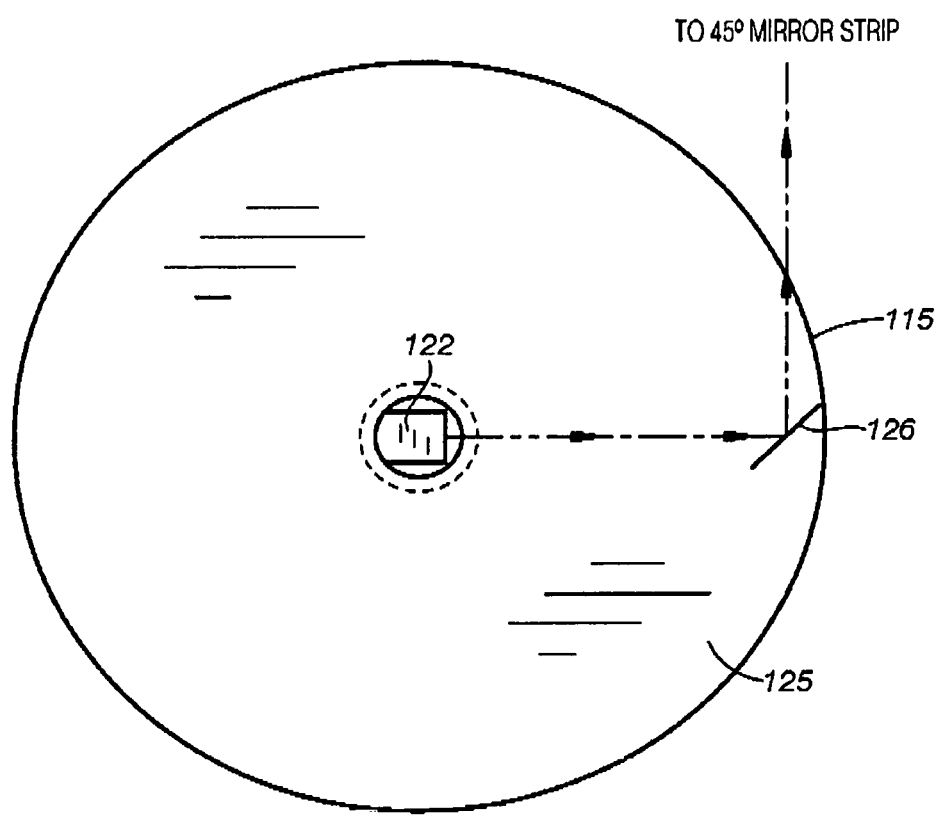
FIG. 4 details a view of modification to the spin disk in order to use a remote radiation source.
Figure 5:
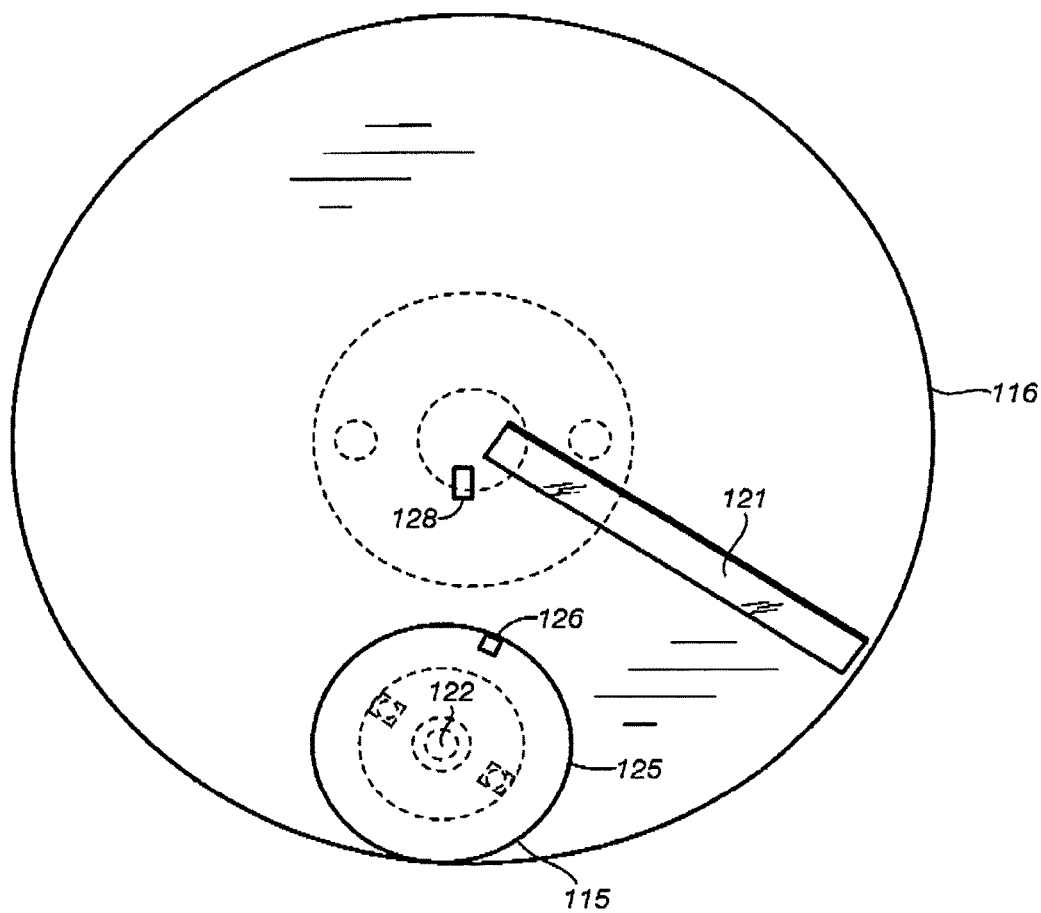
FIG. 5 is a top view with screen of the disclosure omitted.
Figure 6:
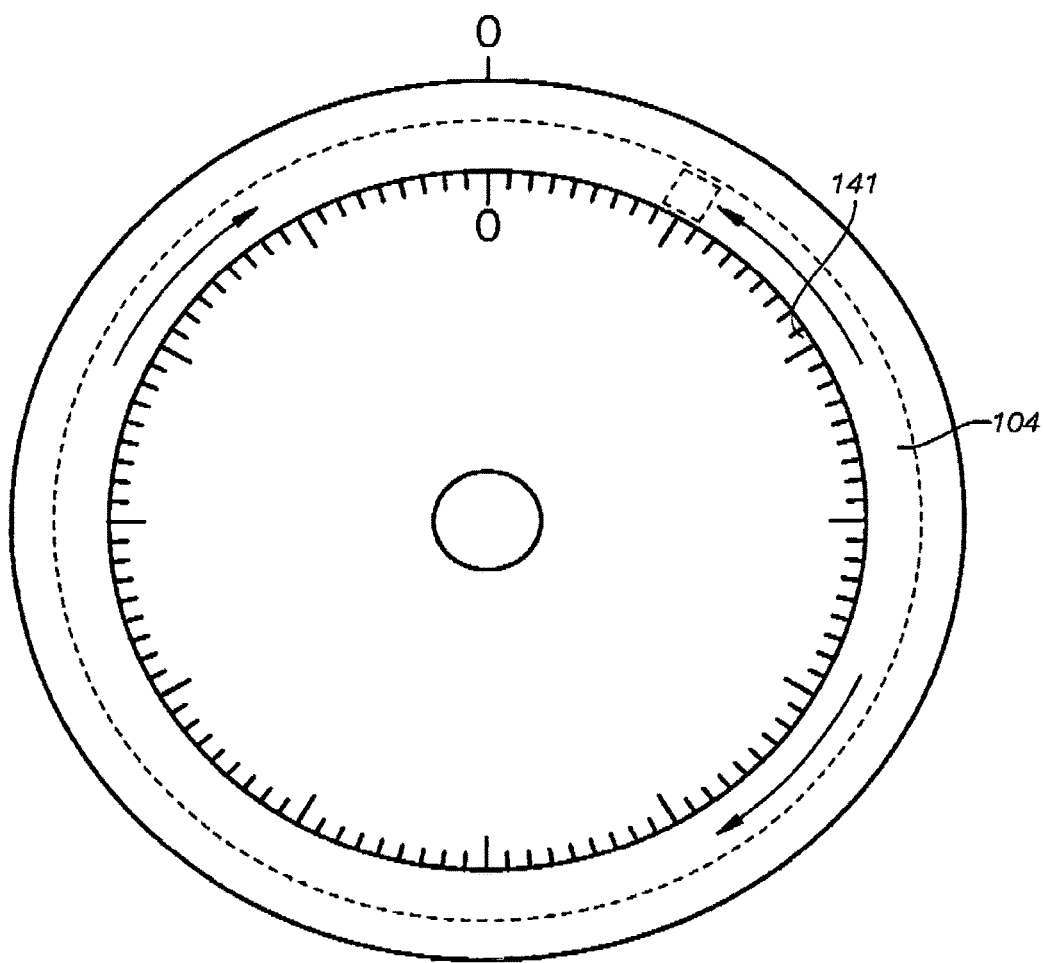
FIG. 6 is an in use view of an embodiment of the disclosure to resolve "range only" for C-scan".
Figure 7:
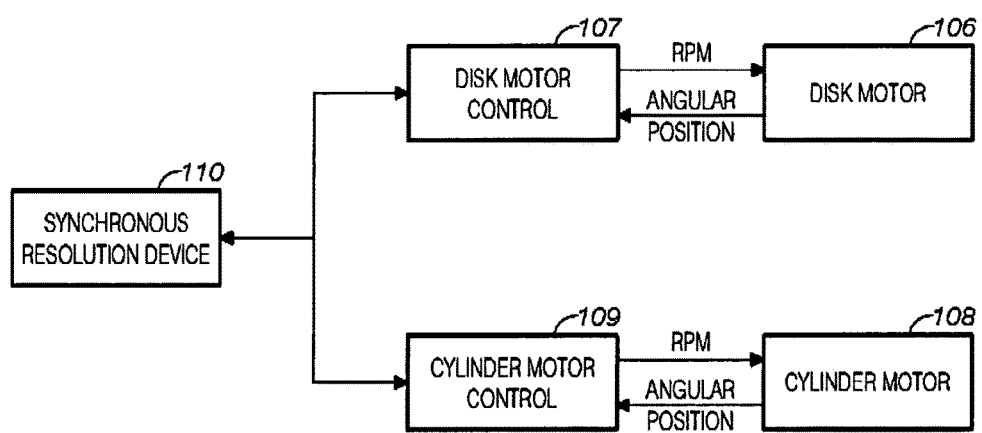
FIG. 7 is a block diagram of a detail of an embodiment of the disclosure.
Figure 8:
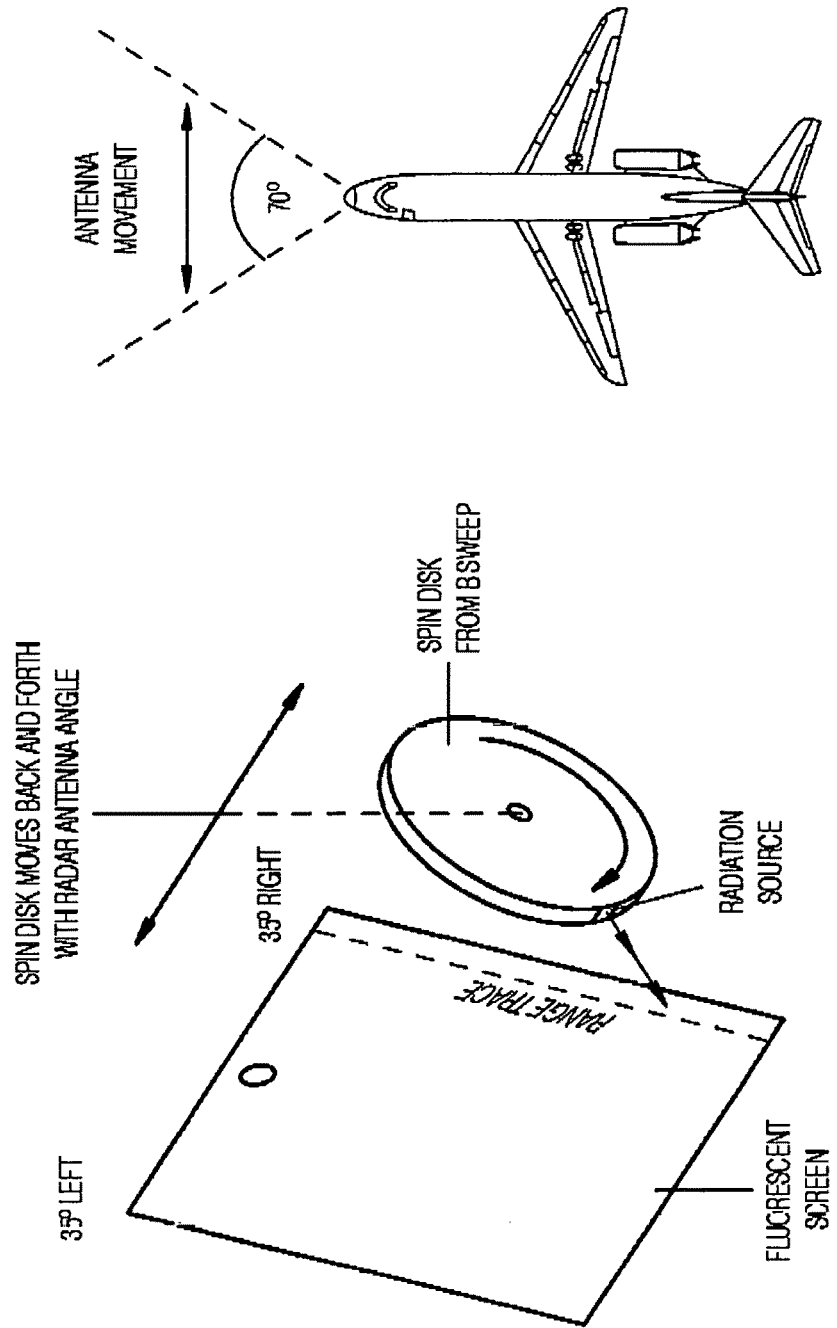
FIG. 8 is an example of a B Sweep embodiment of the disclosure.

As shown most clearly in FIGS. 2, 3, and 4, the cylinder mirror 122 is further positioned such that: 1) the cylinder mirror 122 is positioned at a 45 degree angle relative to the center axis of the rotating cylinder 105; 2) the cylinder mirror 122 reflects a ray of light that is parallel to the center axis of the rotating cylinder 105 to an angle perpendicular to the center axis of die rotating cylinder 105; and, 3) the cylinder mirror 122 is positioned such that a ray of light reflected by the cylinder mirror 122 that is perpendicular to the center axis of the rotating cylinder 105 will be reflected by the triangular prism mirror 121. The triangular prism mirror 121 is positioned on the first rotating disk 104 such that a ray of light received from the cylinder mirror 122 will be reflected 90 degrees such that the reflected ray of light is perpendicular to the first plane 123 of the first rotating disk 104 and will strike the fluorescent screen 101 at a perpendicular angle to the second plane 124 of the fluorescent screen 101.

In a second potential embodiment of the disclosure, the cylinder mirror 122 of the first potential embodiment of the disclosure is directly replaced with the radiation source 103. The radiation source 103 is mounted in the second end 132 of the rotating cylinder 105 such that radiation emitted by the radiation source 103 forms a ray that is perpendicular to the center axis of the rotating cylinder 105.

In a third potential embodiment of the disclosure comprises the first potential embodiment of the disclosure but further comprises a second rotating disk 125 and a compensating mirror As shown most clearly in FIG. 2, the second rotating disk 125 is attached to the rotating cylinder 105 such that the second rotating disk 125 rotates in a fixed manner with the rotating cylinder The compensating mirror 126 is mounted in a fixed position on the second rotating disk 125 such that the radiation reflected off the cylinder mirror 122 is targeted directly at the compensating mirror 126. The compensating mirror 126 is positioned such that the compensating mirror 126 reflects the a ray of radiation received from the cylinder mirror 122 in a direction that is: 1) perpendicular to the direction of the ray of radiation before the ray of radiation strikes the compensating mirror 126; and, 2) a third plane formed by the ray of radiation before the ray of radiation strikes the compensating mirror 126 and the ray of radiation reflected by the compensating mirror 126 is perpendicular to the center axis of the rotating cylinder 105. The compensating mirror 126 improves the linearity and the display accuracy of the invention 100 relative to the first potential embodiment of the disclosure and the second potential embodiment of the disclosure by reducing the variation in the span of travel between the compensating mirror 126 and any point the triangular prism mirror 121 relative to what can be accomplished by die cylinder mirror 122 (first potential embodiment) or the radiation source 103 (second potential embodiment) without compensation. The third potential embodiment of the disclosure is therefore preferred.

The general theory of operation of the first potential embodiment of the disclosure is now described. The use of the first potential embodiment of the disclosure is exemplary. Those skilled in the electrical arts and the mechanical arts will recognize that no significant modifications of the general theory of operation are required to accommodate the second potential embodiment of the disclosure or the third potential embodiment. The radiation generated by the radiation source 103 is shot through the first end 131 of the rotating cylinder 105 to cylinder mirror 122 mounted on the second end 132 of the rotating cylinder 105 where the radiation is reflected at a right angle to the triangular prism mirror 121. The triangular prism mirror 121 reflects the radiation at a right angle to the fluorescent screen 101, which visibly illuminates the fluorescent material that coats the fluorescent screen 101 because the first rotating disk 104 is constantly rotating, the relative position of the triangular prism mirror 121 to the fluorescent screen 101 is always changing. Because the rotating cylinder 105 rotates independently of the first rotating disk 104, the position of the cylinder mirror 122 is always changing relative to the position of the triangular prism mirror 121. Because the triangular prism mirror 121 and the cylinder mirror 122 rotate independently, every location on the working surface of the fluorescent screen 101 can be mapped to a relative position of the triangular prism mirror 121 and the cylinder mirror 122. By generating a burst of radiation at the proper relative position of the cylinder mirror 122 and the triangular prism mirror 121, the invention 100 is able to illuminate every point on the fluorescent screen 101.

The target structure 116 is mounted on a rotating shaft 117. The rotation of the target structure 116 is driven via a disk motor 106. The disk motor 106 is an electric motor. The disk motor 106 further comprises a disk motor control 107. The disk motor control 107 is a variable speed motor controller that is capable of varying speed based on signals provided by the synchronous resolution device 110. The disk motor control 107 further monitors the angular position of the first rotating disk 104.

As shown most clearly in FIG. 2, the source structure 115 is mounted on the first rotating disk 104. The rotation of the source structure 115 driven via a cylinder motor 108. The cylinder motor 108 is mounted on the first rotating disk 104 such that the cylinder motor 108 is proximal the surface of the first rotating disk 104 that is distal from the first plane 123 of the first rotating disk 104 (on which the triangular prism mirror 121 is mounted). The cylinder motor 108 is an electric motor. The cylinder motor 108 further comprises a cylinder motor control 109. The cylinder motor control 109 is a variable speed motor controller that is capable of varying speed based on signals provided by the synchronous resolution device. The cylinder motor control 109 further monitors the angular position of the rotating cylinder 105.

As shown most clearly in FIG. 1, the direction of rotation 127 of both the first rotating disk 104 and the rotating cylinder 105 are in the same direction.

The synchronous resolution device 110 is a mechanical or an electrical device that is used to synchronize the operation of the invention 100 to the operation of the radar antenna.

Specifically, the synchronous resolution device 110 ensures that when the antenna completes one rotational cycle, the first rotating disk 104 and the rotating cylinder 105 have cycled through all locations on the fluorescent screen 101 at least once or a integer multiple of such a cycle. Depending on the design, the synchronous resolution device 110 can also contain a logic function that maps the display signals provided by a traditional radar unit to the mapping required to display the radar image on the invention 100.

In operation, the invention 100 can be used as a regular radar screen.

The following definitions were used in this disclosure:

Center: As used in this disclosure, a center is a point that is: 1) the point within a circle that is equidistant from all the points of the circumference; 2) the point within a regular polygon that is equidistant from all die vertices of the regular polygon; 3) the point on a line that is equidistant from the ends of the line; or, 4) the point, pivot, or axis around which something revolves.

Center Axis: As used in this disclosure, the center axis is the axis of a cylinder like structure. When the center axes of two cylinder-like structures share the same line they are said to be aligned. When the center axes of two cylinder-like structures do not share the same line they are said to be offset.

Cylinder: As used in this disclosure, a cylinder is a geometric solid defined by two identical flat and parallel ends that are circular in shape and connected with a single curved surface wherein when the cross section of the cylinder remains the same from one end to another. The axis of the cylinder is formed by the straight line that connects the center of each of the two identical flat and parallel ends of the cylinder. In this disclosure, the term cylinder specifically means a right cylinder which is defined as a cylinder wherein the curved surface perpendicularly intersects with the two identical flat and parallel ends.

Diode: As used in this disclosure, a diode is a two terminal semiconductor device that allows current flow in only one direction. The two terminals are called the anode and die cathode.

Disk: As used in this disclosure, a disk is a cylindrically shaped object that is flat is appearance.

Display: As used in this disclosure, a display is a surface upon which is projected an image, potentially including, but not limited to, graphic images and text, that is interpretable by an individual viewing the projected image in a meaningful manner.

Electric Motor: In this disclosure, an electric motor is a machine that converts electric energy into rotational mechanical energy.

Fluorescence: As used in this disclosure, fluorescence is the emission of electromagnetic radiation, especially visible light, resulting from the absorption of stimulating radiation and persisting only so long as the stimulating radiation is continued. In a secondary usage, fluorescence will also refer to the electromagnetic radiation that is emitted as described above.

Fluorescent: As used in this disclosure, fluorescent is an adjective that is used to describe an object that exhibits or is capable of exhibiting fluorescence.

Fluorescent Screen: As used in this disclosure, a fluorescent screen is a flat transparent plate that is coated with a fluorescent material. The when the fluorescent material is stimulated with radiation, the fluorescent material will fluorescence and be visible through the flat transparent plate.

LED: As used in this disclosure, an LED is an acronym for a light emitting diode. A light emitting diode is a diode that is also a radiation source.

Plate: As used in this disclosure, a plate is a smooth, flat and rigid object that has at least one dimension that: 1) is of uniform thickness; and 2) that appears thin relative to the other dimensions of the object. Plates often have a rectangular or disk like appearance.

Switch: As used in this disclosure, a switch is an electrical device that starts and stops that flow of electricity through an electric circuit.

Ultraviolet Light: As used in this disclosure, ultraviolet light is understood to be electromagnetic radiation with a wavelength lesser than visible light. In general usage, ultraviolet light is taken to mean electromagnetic radiation with a wavelength less than 400 nm.

UV: As used in this disclosure, UV is an abbreviation for ultraviolet.

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention As defined in the following claims. Accordingly, the invention is to be limited only by the scope of the following claims and their equivalents.

Beam detector: 128, as used in this disclosure, a light sensor used to generate a trigger pulse to trigger a radar transmitter when the light source beam from light source, 126, approaches the triangular prism/mirror.

What is claimed is:

1. A display system comprising:
    a fluorescent screen, a plurality of rotating structures, and a radiation source;
    wherein the display screen is adapted for use with a radar system;
    wherein the radiation source stimulates the fluorescent screen;
    wherein the track of radiation generated by the radiation source is directed by the plurality of rotating structures;
    wherein the radiation generated by the radiation source is directed to a target location on the fluorescent screen by the plurality of rotating structures;
    wherein the target location on the fluorescent screen is received from the radar system the display system is adapted to work with.

2. The display system according to claim 1
    wherein the fluorescent screen is a transparent plate;
    wherein the transparent plate has applied to a first surface a fluorescent material.

3. The display system according to claim 2
    wherein the radiation source is an LED that is configured to generate UV radiation;
    wherein the radiation source has a switching response time of less than 201 nanoseconds.

4. The display system according to claim 3
    wherein the plurality of rotating structures further comprises a source structure and a target structure;
    wherein the source structure houses the radiation source;
    wherein the source structure is a rotating structure;
    wherein the target structure is a rotating structure;
    wherein radiation generated is reflected by the target structure to stimulate the fluorescent screen.

5. The display system according to claim 4
    wherein the target structure comprises a first rotating disk;
    wherein the first rotating disk is a flat disk shaped structure that is mounted on a rotating shaft that allows the first rotating disk to rotate freely around the center of a first plane of the first rotating disk;
    wherein the first plane of the first rotating disk is parallel to the first surface of the fluorescent screen.

6. The display system according to claim 5
    wherein the target structure comprises a triangular prism mirror;
    wherein the triangular prism mirror is mounted on the first rotating disk such that when the first rotating disk completes one revolution of rotation the area traced by the triangular prism mirror encompasses the surface area of the first surface of the fluorescent screen.

7. The display system according to claim 6
    wherein the source structure comprises a rotating cylinder, the radiation source, and a cylinder mirror;
    wherein the rotating cylinder is a hollow cylindrical structure that is further defined with a first end and a second end;
    wherein the first end and the second end are open;
    wherein the rotating cylinder rotates freely around the center axis of the rotating cylinder;
    wherein the radiation source is positioned at the first end of the rotating cylinder;
    wherein the cylinder mirror is mounted on the second end of the rotating cylinder such that cylinder mirror rotates with the rotating cylinder in a fixed position relative to the rotating cylinder.

8. The display system according to claim 7 wherein the radiation source is positioned at the first end of the rotating cylinder and is aligned to send radiation generated by the radiation source through the rotating cylinder on a vector that is aligned with the center axis of the rotating cylinder.

9. The display system according to claim 8
    wherein the cylinder mirror is positioned at a 45 degree angle relative to the center axis of the rotating cylinder;
    wherein the cylinder mirror is positioned such that the cylinder mirror reflects a ray of light that is parallel to the center axis of the rotating cylinder to an angle perpendicular to the center axis of the rotating cylinder;
    wherein the cylinder mirror is positioned such that a ray of light reflected by the cylinder mirror that is perpendicular to the center axis of the rotating cylinder will be reflected by the triangular prism mirror.

10. The display system according to claim 9 wherein the triangular prism mirror is positioned on the first rotating disk such that a ray of light received from the cylinder mirror will be reflected 90 degrees such that the reflected ray of light is perpendicular to the first plane of the first rotating disk and will strike the fluorescent screen at a perpendicular angle to the first surface of the fluorescent screen.

11. The display system according to claim 8
    wherein the source structure further comprises a second rotating disk and a compensating mirror;
    wherein the second rotating disk is attached to the rotating cylinder such that the second rotating disk rotates in a fixed manner with the rotating cylinder;
    wherein the compensating mirror is mounted in a fixed position on the second rotating disk such that the radiation reflected off the cylinder mirror is targeted directly at the compensating mirror;
    wherein the cylinder mirror is positioned at a 45 degree angle relative to the center axis of the rotating cylinder;
    wherein the cylinder mirror is positioned such that the cylinder mirror reflects a ray of light that is parallel to the center axis of the rotating cylinder to an angle perpendicular to the center axis of the rotating cylinder;
    wherein the cylinder mirror is positioned such that a ray of light reflected by the cylinder mirror that is perpendicular to the center axis of the rotating cylinder will be reflected by the compensating mirror;
    wherein the compensating mirror is positioned on the second rotating disk such that a ray of light received from the cylinder mirror will be reflected 90 degrees such that the reflected ray of light is perpendicular to the first plane of the first rotating disk and will strike the triangular prism.

12. The display system according to claim 11
    wherein the compensating mirror is positioned such that the compensating mirror reflects the a ray of radiation received from the cylinder mirror in a direction that is perpendicular to the direction of the ray of radiation before the ray of radiation strikes the compensating mirror;
    wherein the compensating mirror is positioned such that a third plane is formed by the ray of radiation before the ray of radiation strikes the compensating mirror and the ray of radiation reflected by the compensating mirror that is perpendicular to the center axis of the rotating cylinder.

13. The display system according to claim 12
wherein the target structure is mounted on a rotating shaft;
wherein the rotation of the target structure is driven via a disk motor;
wherein the disk motor further comprises a disk motor control;
wherein the cylinder motor control is a variable speed motor controller.

14. The display system according to claim 13
wherein the source structure is mounted on the first rotating disk;
wherein the rotation of the source structure driven via a cylinder motor;
wherein the cylinder motor is mounted on the first rotating disk such that the cylinder motor is proximal to the surface of the first rotating disk that is distal from the first plane of the first rotating disk;
wherein the cylinder motor further comprises a cylinder motor control;
wherein the cylinder motor control is a variable speed motor controller.

15. The display system according to claim 14 wherein the direction of rotation of both the first rotating disk and the rotating cylinder are in the same direction.

16. The display system according to claim 15 wherein the untreated surface of the fluorescent screen is marked.

17. The display system according to claim 6
wherein the source structure comprises a rotating cylinder and the radiation source;
wherein the rotating cylinder is a hollow cylindrical structure that is further defined with a first end and a second end;
wherein the rotating cylinder rotates freely around the center axis of the rotating cylinder;
wherein the radiation source is positioned at the second end of the rotating cylinder;
wherein the radiation source is mounted on the second end of the rotating cylinder such that radiation source rotates with the rotating cylinder in a fixed position relative to the rotating cylinder;
wherein the radiation source is positioned such that the radiation source generates a vector of radiation that is perpendicular to the center axis of the rotating cylinder;
wherein the radiation source is positioned such that radiation generated by the radiation source will be reflected by the triangular prism mirror;
wherein the triangular prism mirror is positioned on the first rotating disk such that radiation generated by the radiation source will be reflected 90 degrees such that the reflected ray of light is perpendicular to the first plane of the first rotating disk and will strike the fluorescent screen at a perpendicular angle to the first surface of the fluorescent screen.

18. The display system according to claim 17
wherein the target structure is mounted on a rotating shaft;
wherein the rotation of the target structure is driven via a disk motor;
wherein the disk motor further comprises a disk motor control;
wherein the cylinder motor control is a variable speed motor controller;
wherein the source structure is mounted on the first rotating disk;
wherein the rotation of the source structure driven via a cylinder motor;
wherein the cylinder motor is mounted on the first rotating disk such that the cylinder motor is proximal to the surface of the first rotating disk that is distal from the first plane of the first rotating disk;
wherein the cylinder motor further comprises a cylinder motor control;
wherein the cylinder motor control is a variable speed motor controller;
wherein the direction of rotation of both the first rotating disk and the rotating cylinder are in the same direction;
wherein the untreated surface of the fluorescent screen is marked.

19. The display system according to claim 6
wherein the source structure comprises a rotating cylinder and the radiation source;
wherein the rotating cylinder is a hollow cylindrical structure that is further defined with a first end and a second end;
wherein the rotating cylinder rotates freely around the center axis of the rotating cylinder;
wherein the radiation source is positioned at the second end of the rotating cylinder;
wherein the radiation source is mounted on the second end of the rotating cylinder such that radiation source rotates with the rotating cylinder in a fixed position relative to the rotating cylinder;
wherein the radiation source is positioned such that the radiation source generates a vector of radiation that is perpendicular to the center axis of the rotating cylinder;
wherein the source structure further comprises a second rotating disk and a compensating mirror;
wherein the second rotating disk is attached to the rotating cylinder such that the second rotating disk rotates in a fixed manner with the rotating cylinder;
wherein the compensating mirror is mounted in a fixed position on the second rotating disk such that the radiation generated by the radiation source is targeted directly at the compensating mirror;
wherein the compensating mirror is positioned such that the compensating mirror reflects a ray of radiation generated by the radiation source in a direction that is perpendicular to the direction of the ray of radiation before the ray of radiation strikes the compensating mirror;
wherein the compensating mirror is positioned such that a third plane is formed by the ray of radiation before the ray of radiation strikes the compensating mirror and the ray of radiation reflected by the compensating mirror that is perpendicular to the center axis of the rotating cylinder;
wherein the radiation source is positioned such that radiation generated by the radiation from the compensating mirror is reflected by the triangular prism mirror;
wherein the triangular prism mirror is positioned on the first rotating disk such that radiation from the compensating mirror will be reflected 90 degrees such that the reflected ray of light is perpendicular to the first plane of the first rotating disk and will strike the fluorescent screen at a perpendicular angle to the first surface of the fluorescent screen.

20. The display system according to claim 19
wherein the target structure is mounted on a rotating shaft;
wherein the rotation of the target structure is driven via a disk motor;
wherein the disk motor further comprises a disk motor control;
wherein the cylinder motor control is a variable speed motor controller;

wherein the source structure is mounted on the first rotating disk;
wherein the rotation of the source structure driven via a cylinder motor;
wherein the cylinder motor is mounted on the first rotating disk such that the cylinder motor is proximal to the surface of the first rotating disk that is distal from the first plane of the first rotating disk;
wherein the cylinder motor further comprises a cylinder motor control;
wherein the cylinder motor control is a variable speed motor controller;
wherein the direction of rotation of both the first rotating disk and the rotating cylinder are in the same direction;
wherein the untreated surface of the fluorescent screen is marked.

* * * * *